(12) United States Patent
Tolentino

(10) Patent No.: US 11,022,233 B2
(45) Date of Patent: Jun. 1, 2021

(54) MAGNETIC LATCH THROTTLE VALVE

(71) Applicant: Aerojet Rocketdyne, Inc., Sacramento, CA (US)

(72) Inventor: Arturo Tolentino, Redmond, WA (US)

(73) Assignee: AEROJET ROCKETDYNE, INC., Redmond, WA (US)

( * ) Notice: Subject to any disclaimer, the term of this patent is extended or adjusted under 35 U.S.C. 154(b) by 0 days.

(21) Appl. No.: 15/569,548

(22) PCT Filed: Apr. 12, 2016

(86) PCT No.: PCT/US2016/027011
§ 371 (c)(1),
(2) Date: Oct. 26, 2017

(87) PCT Pub. No.: WO2016/178800
PCT Pub. Date: Nov. 10, 2016

(65) Prior Publication Data
US 2018/0094742 A1    Apr. 5, 2018

Related U.S. Application Data

(60) Provisional application No. 62/156,239, filed on May 2, 2015.

(51) Int. Cl.
*F16K 31/08* (2006.01)
*F16K 31/06* (2006.01)
(52) U.S. Cl.
CPC ........ *F16K 31/082* (2013.01); *F16K 31/0655* (2013.01)

(58) Field of Classification Search
USPC .......................................................... 251/65
See application file for complete search history.

(56) References Cited

U.S. PATENT DOCUMENTS

| 3,361,161 A | | 1/1968 | Schwartz | |
|---|---|---|---|---|
| 4,159,026 A | * | 6/1979 | Williamson | ........ F16K 31/0606 137/625.5 |
| 4,538,129 A | * | 8/1985 | Fisher | ................... F16K 31/082 137/625.65 |

FOREIGN PATENT DOCUMENTS

| DE | 102009015231 | 10/2010 |
|---|---|---|
| WO | 03076836 | 9/2003 |

OTHER PUBLICATIONS

International Search Report for International Patent Application No. PCT/US2016/027011 completed Jul. 1, 2016.
International Preliminary Report on Patentability for PCT/US2016/027011 dated Nov. 16, 2017.

* cited by examiner

*Primary Examiner* — Daphne M Barry

(57) ABSTRACT

A latch valve includes a ferromagnetic shell, a ferromagnetic pole, a permanent magnet disposed within the ferromagnetic shell, an electromagnet disposed within the ferromagnetic shell, a seal, and a magnetic plunger disposed within the ferromagnetic shell. The ferromagnetic shell, the permanent magnet, the electromagnet and the magnetic plunger are configured in a magnetic circuit, and the magnetic plunger is configured to selectively compresses the seal based on a force produced by the magnetic circuit.

14 Claims, 1 Drawing Sheet

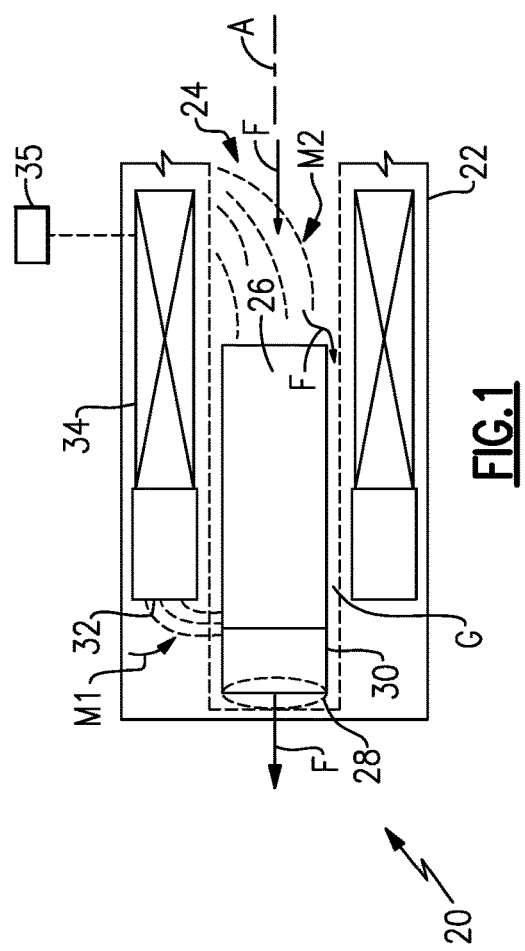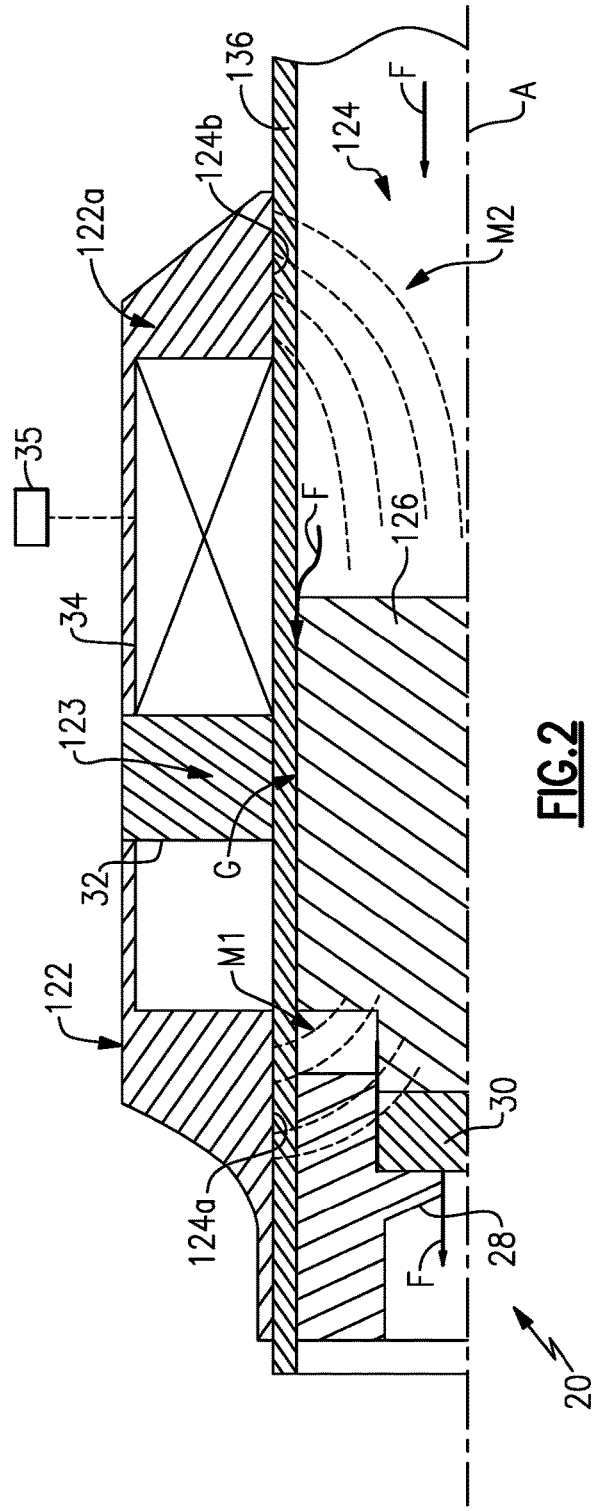

MAGNETIC LATCH THROTTLE VALVE

REFERENCE TO RELATED APPLICATIONS

This application claims priority to U.S. Provisional Application No. 62/156,239, filed on May 2, 2015.

BACKGROUND

Throttle valves, check valves, and the like typically include a valve member to control fluid flow. Such valves often include an internal spring that biases the valve member to a default position, for example. Close tolerances of the spring, valve member, and valve housing are also often required in order to obtain the desired operation. Because of the close tolerances, several iterations of adjustments are needed during assembly.

SUMMARY

A latch valve according to an example of the present disclosure includes a ferromagnetic shell, a ferromagnetic pole, a permanent magnet disposed within the ferromagnetic shell, an electromagnet disposed within the ferromagnetic shell, a seal, and a magnetic plunger disposed within the ferromagnetic shell. The ferromagnetic shell, the permanent magnet, the electromagnet and the magnetic plunger are configured in a magnetic circuit. The magnetic plunger is configured to selectively compress the seal based on a force produced by the magnetic circuit.

A further embodiment of any of the foregoing embodiments includes a liner fluidly isolating the magnetic plunger from the permanent magnet and the electromagnet.

In a further embodiment of any of the foregoing embodiments, the permanent magnet and the electromagnet are co-axially arranged.

In a further embodiment of any of the foregoing embodiments, the seal is elastomeric.

In a further embodiment of any of the foregoing embodiments, the permanent magnet generates a first magnetic field in the magnetic circuit that magnetically latches the magnetic valve member to apply a load on the seal and compress the seal, and the electromagnet is configured to generate a variable second magnetic field that magnetically influences the magnetic valve member to vary the load on the seal and thereby selectively compress the seal.

The latch valve as recited in claim 5, further comprising a controller electrically connected with the electromagnet and configured to vary the second magnetic field responsive to flow output past the seal.

A latch valve according to an example of the present disclosure includes a magnetic chamber that defines a flow passage, a seal seat in the flow passage, and a seal disposed against the seal seat such that the seal restricts flow through the flow passage. A magnetic valve member is disposed in the flow passage adjacent the seal. A permanent magnet generates a first magnetic field that magnetically latches the magnetic valve member to apply a load on the seal against the seal seat, and an electromagnet is configured to generate a variable second magnetic field that magnetically influences the magnetic valve member to vary the load on the seal against the seal seat.

In a further embodiment of any of the foregoing embodiments, the permanent magnet and the electromagnet are co-axially arranged.

In a further embodiment of any of the foregoing embodiments, the magnetic chamber includes a shell encompassing the electromagnet, the permanent magnet, and the magnetic valve member.

In a further embodiment of any of the foregoing embodiments, the magnetic chamber includes a liner located radially inwards of the shell. The liner fluidly isolates the magnetic valve member from the electromagnet and the permanent magnet.

In a further embodiment of any of the foregoing embodiments, the seal is elastomeric.

A further embodiment of any of the foregoing embodiments includes a controller electrically connected with the electromagnet and configured to vary the second magnetic field responsive to flow output from the flow passage through the seal seat.

In a further embodiment of any of the foregoing embodiments, the magnetic chamber is free of any mechanical springs.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example latch valve.

FIG. 2 illustrates another example latch valve.

DETAILED DESCRIPTION

FIG. 1 schematically illustrates an example of a latch valve 20. As will be described, the latch valve 20 uses magnetic fields, rather than a mechanical spring, to latch the valve in the closed position and to control fluid flow. As will be appreciated, the latch valve 20 is depicted as a throttle valve, but other types of valves may also benefit from this disclosure.

In this example, the latch valve 20 includes a magnetic chamber 22 that defines a flow passage 24 about a central axis A. For instance, the magnetic chamber 22 is formed of a ferromagnetic material that guides and controls the magnetic field. A magnetic valve member 26 is disposed in the flow passage 24. For example, the magnetic valve member 26 may be, but is not limited to, a magnetic plunger.

The latch valve 20 further includes a seal seat 28 in the flow passage 24 and a seal 30 that abuts the seal seat 28. The seal 30 may be an elastomeric element. The magnetic valve member 26 abuts the seal 30.

Fluid flows generally axially in the flow passage 24 and through a gap G between the magnetic valve member 26 and the magnetic chamber 22. The seal 30 seals against the seal seat 28. The fluid controllably "leaks" past the seal 30 and through the seal seat 28 as output flow from the latch valve 20. As will be described further, the amount of fluid that flows past the seal 30 depends on the magnitude of the load applied to the seal 30 by the magnetic valve member 26, which thereby controls the magnitude of compression of the seal 30.

The latch valve 20 also includes a permanent magnet 32 and an electromagnet 34. For example, the permanent magnet 32 is in the form of an annular permanent magnet about the central axis A. The permanent magnet 32 generates a first magnetic field, represented at M1. The magnetic valve member 26 is within the first magnetic field M1, which attracts the magnetic valve member 26. The first magnetic field M1 magnetically holds, or "latches," the magnetic valve member 26 to apply a load on the seal 30 against the seal seat 28 and a default magnitude of compression of the seal 30.

The electromagnet 34, such as a coil, is disposed as an annular structure around the central axis A. The electromagnet 34 is configured to generate a second, variable magnetic field, represented at M2. The variable second magnetic field M2 can be used to selectively magnetically influence the magnetic valve member 26 to vary the load on the seal 30 against the seal seat 28, and thereby selectively vary the magnitude of compression of the seal 30. A controller 35 may be electrically connected with the electromagnet 34, to control operation thereof. In this regard, the controller 35 may include software, hardware, such as a microprocessor, or both to control the second magnetic field M2 as described herein.

For example, to reduce fluid flow through the seal seat 28, the strength of the variable second magnetic field M2 may be decreased to magnetically urge the magnetic valve member 26 against the seal 30 with a greater force such that less fluid can leak between the seal 30 and the seal seat 28. To increase fluid flow through the seal seat 28, the strength of the variable second magnetic field M2 may be increased to magnetically urge the magnetic valve member 26 against the seal 30 with a lesser force such that more fluid can leak between the seal 30 and the seal seat 28. Although the variable second magnetic field M2 and the applied force changes, the magnetic valve member 26 in essence remains static in the fluid passage 24. In this manner, the controller 35, via the variable second magnetic field M2, can control the force applied to the seal 30 responsive to the output flow of the fluid from the latch valve 20.

As will be appreciated, the inverse relationship between the strength of the variable second magnetic field M2 and the load on the seal 30 may be used to control the force applied to the seal 30, depending on the direction of the variable second magnetic field M2. Additionally or alternatively, the directionality of the variable second magnetic field M2 may be used to control the force applied to the seal 30.

FIG. 2 illustrates another example of a latch valve 120, which is symmetric about the central axis A. In this disclosure, like reference numerals designate like elements where appropriate and reference numerals with the addition of one-hundred or multiples thereof designate modified elements that are understood to incorporate the same features and benefits of the corresponding elements. In this example, the magnetic chamber 122 includes a ferromagnetic shell 122a that has ferromagnetic poles 124a/124b. For instance, the ferromagnetic shell 122a is formed of a ferromagnetic material that guides and controls the magnetic fields. In this example, the magnetic valve member 126 is a magnetic plunger that is formed of a ferromagnetic material. The ferromagnetic shell 122a, the electromagnet 34, the permanent magnet 32, and the magnetic plunger are configured in a magnetic circuit 123.

The latch valve 120 also includes a liner 136 inside of the shell 122a. The liner 136 defines the fluid passage 124 and fluidly isolates the magnetic valve member 126 from the electromagnet 34 and the permanent magnet 32. Thus, although there may be fluid in the fluid passage 124, the electromagnet 34 and the permanent magnet 32 are not directly exposed to the fluid.

In the illustrated example, the electromagnet 34 and the permanent magnet 32 are co-axially arranged about the central axis A. The magnetic pole 124a is axially forward of the permanent magnet 32 and the electromagnet 34, and magnetic pole 124b is axially aft of the permanent magnet 32 and the electromagnet 34. The magnetic poles 124a/124b are thus also co-axially arranged with the electromagnet 34 and the permanent magnet 32. The co-axial layout thus provides a relatively compact arrangement, which also facilitates assembly.

Similar to the latch valve 20, the variable second magnetic field M2 of the electromagnet 34 can be used to selectively magnetically influence the magnetic valve member 126 to vary the load on the seal 30 against the seal seat 28 and thereby selectively compress the seal based on a force produced by the magnetic circuit. selectively compresses the seal based on a force produced by the magnetic circuit.

The latch valve 120 may also provide relatively easy assembly and reduce the need for assembly adjustments. For instance, the latch valve 120 may be assembled by inserting the magnetic valve member 126 into the liner 136 followed by inserting the shell 122a about the liner 136. The permanent magnet 32 and the electromagnet 34 are then, respectively, inserted into the annular gap between the liner 136 and the shell 122a. The shell 122a may be provided in several pieces to further facilitate assembly, and the assembly may be held together using spring washers, fasteners, or the like. The latch valves 20/120 are also free of any mechanical springs and there is thus no need for reiterative adjustment during assembly to hone the spring load or gaps. In this regard, the latch valve 20/120 can utilize relatively large gaps and omit tolerances that would otherwise be necessary for proper operation of a mechanical spring. In essence, the permanent magnet 32 serves as a dynamically adjustable magnetic "spring."

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A latch valve comprising:
a ferromagnetic shell;
a ferromagnetic pole;
a permanent magnet disposed within the ferromagnetic shell;
an electromagnet disposed within the ferromagnetic shell;
a seal seat and a seal abutting the seal seat, wherein fluid can leak past the seal when the seal is abutting the seal seat; and
a magnetic plunger disposed within the ferromagnetic shell, wherein the ferromagnetic shell, the permanent magnet, the electromagnet and the magnetic plunger are configured in a magnetic circuit, and wherein the magnetic plunger is configured to selectively compresses the seal based on a force produced by the magnetic circuit, wherein the permanent magnet generates a first magnetic field in the magnetic circuit that magnetically latches the magnetic plunger to apply a load on the seal and compress the seal, and the electromagnet is configured to generate a variable second magnetic field that magnetically influences the magnetic plunger to vary between a first force that the magnetic plunger applies on the seal abutting the seal seat and a second, lower force that the magnetic plunger applies on the seal abutting the seal seat, wherein the seal remains abutting the seal seat under the first force and under the second force and variation of the variable second magnetic field controls an amount of the fluid that leaks past the seal while the seal is abutting the seal seat.

2. The latch valve as recited in claim 1, further comprising a liner fluidly isolating the magnetic plunger from the permanent magnet and the electromagnet.

3. The latch valve as recited in claim 1, wherein the permanent magnet and the electromagnet are co-axially arranged.

4. The latch valve as recited in claim 1, wherein the seal is elastomeric.

5. The latch valve as recited in claim 1, further comprising a controller electrically connected with the electromagnet and configured to vary the second magnetic field responsive to flow output past the seal.

6. A latch valve comprising:
a magnetic chamber defining a flow passage;
a seal seat in the flow passage and a seal disposed against the seal seat, wherein fluid can leak past the seal when the seal is against the seal seat;
a magnetic valve member disposed in the flow passage adjacent the seal;
a permanent magnet generating a first magnetic field that magnetically latches the magnetic valve member to apply a load on the seal against the seal seat;
an electromagnet configured to generate a variable second magnetic field that magnetically influences the magnetic valve member to vary the load on the seal while against the seal seat, wherein under the variable second magnetic field the seal remains against the seal seat and variation of the variable second magnetic field controls an amount of the fluid that leaks past the seal while the seal is against the seal seat.

7. The latch valve as recited in claim 6, wherein the permanent magnet and the electromagnet are co-axially arranged.

8. The latch valve as recited in claim 6, wherein the magnetic chamber includes a shell encompassing the electromagnet, the permanent magnet, and the magnetic valve member.

9. The latch valve as recited in claim 8, wherein the magnetic chamber includes a liner located radially inwards of the shell, the liner fluidly isolating the magnetic valve member from the electromagnet and the permanent magnet.

10. The latch valve as recited in claim 6, wherein the seal is elastomeric.

11. The latch valve as recited in claim 6, further comprising a controller electrically connected with the electromagnet and configured to vary the second magnetic field responsive to flow output from the flow passage through the seal seat.

12. The latch valve as recited in claim 6, wherein the magnetic chamber is free of any mechanical springs.

13. The latch valve as recited in claim 6, wherein the electromagnet is configured to change direction of the variable second magnetic field to vary the load on the seal while against the seal seat.

14. The latch valve as recited in claim 6, wherein a decrease in the variable second magnetic field decreases the amount of the fluid that leaks past the seal and an increase in the variable second magnetic field increases the amount of the fluid that leaks past the seal.

* * * * *